(12) United States Patent
Yaple

(10) Patent No.: US 6,922,730 B1
(45) Date of Patent: Jul. 26, 2005

(54) DEDICATED DIGITAL-TO-ANALOG NETWORK AUDIO BRIDGING SYSTEM

(75) Inventor: Nelson L. Yaple, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/467,388

(22) Filed: Dec. 21, 1999

(51) Int. Cl.⁷ .............................................. G06F 15/16

(52) U.S. Cl. ........................ 709/231; 709/235; 709/238

(58) Field of Search ................................ 709/231, 235, 709/238

(56) References Cited

U.S. PATENT DOCUMENTS

| | | | |
|---|---|---|---|
| 5,721,951 A | | 2/1998 | DorEl |
| 5,844,600 A | * | 12/1998 | Kerr ............................. 348/17 |
| 5,954,834 A | * | 9/1999 | Hassan et al. .............. 714/758 |
| 5,973,722 A | | 10/1999 | Wakai et al. |
| 6,185,737 B1 | * | 2/2001 | Northcutt et al. ........... 725/110 |
| 6,256,487 B1 | * | 7/2001 | Bruhn ......................... 455/352 |
| 6,378,101 B1 | * | 4/2002 | Sinha et al. ................. 714/755 |
| 6,507,611 B1 | * | 1/2003 | Imai et al. ................... 375/222 |

FOREIGN PATENT DOCUMENTS

| | | |
|---|---|---|
| EP | 0457673 A2 | 11/1991 |
| WO | WO 98/34377 | 8/1998 |
| WO | WO 98/23789 | 5/1999 |

OTHER PUBLICATIONS

Haartsen, J., "Bluetooth—The Universal Radio Interface for Ad Hoc, Wireless Connectivity," *Ericsson Review*, No. 3, 1998, pp. 110–117.

Onufryk, P.Z. and Snyder, J. H., "Consumer Devices for Networked Audio," *Isie '97 Proceeding of the IEEE International Symposium on Industrial Electronics*, vol. 1, Jul. 7–11, 1997, pp. ss27–ss32.

Grunding, et al., "The HAVi Architecture, Version 0.8," *Havi Architecture*, May 15, 1998, pp. 6–18.

Boeri, R. J., "QuickTime 3.0 Pro for Windows 95," *Emedia Professional, Online Inc*, vol. 11 No. 9, Sep. 1998, pp. 78–80.

Johnson, V. and Johnson, M., "Higher Level Protocols Used with IP Multicast," IP *Multicast Initiative (IPMI)*, 1995–1999 [copyright]. Available: http://www.ipmulticast-.com/community/whitepapers/highprot.html. Nov. 16, 1999.

Davis, J., "MP3 Coming to a Home Stereo Near You," *CNET News.com*, Aug. 1999. Available: http://news.cnet.com/news/0–1006–2...93.html?tag=st.ne.1006–200–114511 Sep. 9, 1999.

"MP3 Anywhere: Bring Digital Music Into Your Life," *X10 WTI*. Available: http://www.x10.com/mp3_x10/mp3_anywhere.htm. Sep. 9, 1999.

"MP3 Anywhere: Technical Specifications," *X10 WTI*. Available: http://www.x10.com/mp3_x10/specifications.htm. Sep. 9, 1999.

(Continued)

*Primary Examiner*—Saleh Najjar
(74) *Attorney, Agent, or Firm*—Blakely, Sokoloff, Taylor & Zafman LLP

(57) ABSTRACT

A dedicated digital-to-analog network audio bridging system. A personal computer equipped with a network card is utilized to transmit digital audio data over a home-based data network using, for example, home telephone lines as the communication medium. A special purpose receiving device receives the transmitted digital audio data, decodes the digital audio data if necessary, and converts the digital audio data to analog audio for output to a home stereo and/or high quality speaker system.

20 Claims, 7 Drawing Sheets

OTHER PUBLICATIONS

Miles, S., "Diamond Sees a Jewel in MP3 Home System," *CNET News.com*, Oct. 4, 1999. Available: http://yahoo.cnet.com/news/0–1006–...46.html?tag=st. ne.r-on.lthd.1006–20. Oct. 4, 1999.

Wong, W, "Hoem Networking Opens Its Doors For Business," *CNET News.com*, Oct. 19, 1999. Available: http://news.cnet.com/news/0–1004–202–920140.html. Oct. 20, 1999.

"Understanding Home Phoneline Networking: A Technical Overview," *Intel Corporation*, 1998.

K. J. Negus et al., "Home RF and Swap: Wireless Networking for the Connected Home," Mobile Computing and Comm. Review, vol. 2, No. 4, Oct. 1, 1998, pp. 28–30, 34.

L. Goldberg, "Bluetooth and Beyond: Wireless Networks Get Personal," Electronic Design, vol. 47, No. 10, pp. 68, 70, 72, 76, 78, 80.

A. Onetti, "Hardware Decoder Chip Simplifies MP3 Audio Player Systems," Electronic Product Design, vol. 20, No. 5, May 1999, pp. 29–30, 32.

A. Basso et al., "Real–time MPEG–2 delivery based on RTP: Implementation issues," Signal Processing: Image Communication, vol. 15, Nos. 1–2, Sep. 1999, pp. 165–178.

AudioTron Digtial Music Website, http://www.audiotron.net/homepage.asp, digital music player product description, 2 pages, Oct. 23, 2001.

Rio Products Website, http://www.riohome.com/products.receiver.htm, Rio receiver product description, 2 pages, Oct. 23, 2001.

\* cited by examiner

DEDICATED DIGITAL-TO-ANALOG NETWORK AUDIO BRIDGING SYSTEM

BACKGROUND OF THE INVENTION

1. Field of the Invention

The present invention relates to the field of data networking. More specifically, the present invention relates to a dedicated digital-to-analog network audio bridging system.

2. Background Information

Rendering audio and even music on a personal computer (PC) is known in the art. In the past, computers contained a single internal speaker which was used to notify users of various system alerts through one or more audible beeps or tones. Early computer games would string together multiple beeps and tones in an attempt to simulate music through such a primitive speaker. As PC technology advanced, expansion cards dedicated to producing more robust audio sound effects and music within PCs became commonplace. Nowadays, audio expansion cards, or "sound cards" as they are known, are quite sophisticated and may even include various dedicated electronic components such as memory and audio processors to generate high-quality audio within a PC.

Most PC sound cards typically contain output ports through which audio from a PC may be directed by way of cables to one or more external pairs of speakers. Due to a variety of factors, external speakers are typically better equipped to produce high-quality sound than are standard issue internal PC speakers and are therefore more often desired as a source of audio output for PCs. In addition to external speakers, the PC audio may also be connected to high-quality external amplification and or digital signal processing components to produce a variety of desired effects. In fact, with the popularity of computer-based compact disc (CD) and digital video/versatile disc (DVD) players, as well as the popularity of realistic computer games and the ability to play digital music data files on PCs, the impetus for users to connect their PCs to home stereo systems is greater than ever.

Unfortunately, however, it is all together too common for a PC to be located in one area of a house (e.g. home office), and a stereo and/or high quality speaker system to be located in a second area of the house (e.g. family room) remote from the first area. Given such a configuration, a user typically has very few options regarding how to route the computer audio output through the home stereo.

Firstly, a user may opt to move the PC into the family room where the stereo/speaker system is located, or conversely, the user may opt to move the stereo/speaker system from the family room into the home office where the PC is located. This, however, may prove to be impractical given the designated uses of the two rooms. For example, the stereo/speaker system may have been part of a combined audio/visual entertainment system located in the family room. Similarly, the PC may have been used as a business computer serving multiple functions including for example, that of facsimile machine connected to a dedicated phone line located in the office.

Secondly, a user may resort to connecting very long cables between the PC and the stereo/speaker system. Not only might such a connection scheme be awkward and unsightly, the audio quality may suffer due to attenuation of the analog audio signal caused by the length of the cables.

Lastly, a user may obtain a second PC for use near the stereo system within the family room. Not only is this an expensive proposition, it still does not solve the problem audio from the office PC being played through the stereo/speaker system.

SUMMARY OF THE INVENTION

A digital-to-analog audio bridge is disclosed. The digital-to-analog audio bridge includes a network interface to receive digital audio data transmitted over a network from a remote audio host, processor coupled with the network interface to identify which one of a plurality coding schemes the received digital audio data has been encoded with, and decode the encoded digital audio data based upon the identified coding scheme. The digital-to-analog audio bridge further includes a converter coupled to the processor to convert the received digital audio data to analog audio for use by a proximately located loudspeaker.

BRIEF DESCRIPTION OF THE DRAWINGS

The present invention will be more fully understood from the detailed description given below and from the accompanying drawings of various embodiments of the invention, which, however, should not be taken to limit the invention to the specific embodiments, but are for explanation and understanding only.

DETAILED DESCRIPTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Parts of the description will be presented using terminology commonly employed by those skilled in the art to convey the substance of their work to others skilled in the art, such as receivers, transmitters and so forth. Also, parts of the description will also be presented in terms of operations performed through the execution of programming instructions, using terms such as determining, and so on. As well understood by those skilled in the art, these operations are often accomplished through storing, transferring, combining, or otherwise manipulating electrical, magnetic, and/or optical signals.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

A dedicated digital-to-analog network audio bridging system is described herein. In the system, a personal computer equipped with a network card is utilized to transmit digital audio data over a home-based data network using, for example, home telephone lines as the communication medium. A special purpose receiving device receives the transmitted digital audio data, decodes the digital audio data if necessary, and converts the digital audio data to analog audio for output to a home stereo and/or high quality speaker system.

Figure 1:
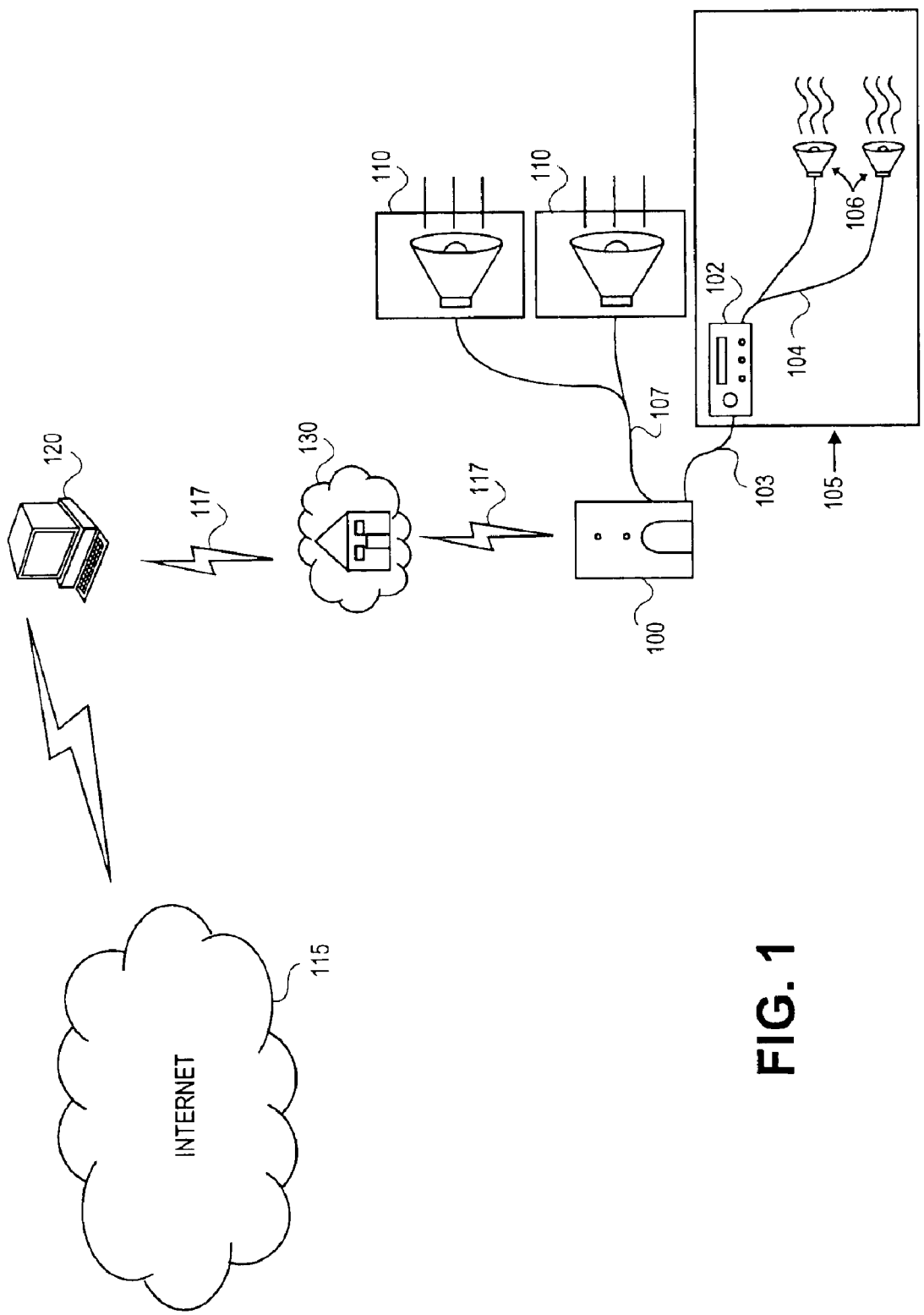
FIG. 1 is a block diagram illustrating a network environment in which the present invention may be practiced.

FIG. 1 is a block diagram illustrating a network environment in which the present invention may be practiced. A dedicated, home network enabled, digital-to-analog audio bridging device (hereinafter "audio bridging device") 100 of the present invention is connected with audio host 120 through home-based network 130 by way of communication links 117. Additionally, audio bridging device 100 is shown connected with stereo system 105 and/or active speakers 110 via audio cables 103 and 107 respectively.

Internet 115 represents a combination of multiple conventional hardware components, including computer systems, routers, repeaters, gateways, and communications links spread throughout the world. The various components of Internet 115 interact to route data, referred to as "packets" or "datagrams", from one networked device, appliance, or computer system to another. Typically, each packet includes the payload data, a source address identifying the system which initiated the packet, and a target or destination address identifying the address to which the packet is to be sent. Additional control information, such as a checksum, may also be included within the packet.

Home-based network 130 represents a local area network (LAN) including for example, a phoneline network, a powerline network, or some other wireline or wireless network capable of transporting data locally throughout a home, office, or similar structure. As with Internet 115, various components of home-based network 130 interact to route data packets or datagrams from one networked device, appliance, or computer system to another.

Communications links 117 may be any of a wide range of conventional communications mediums and may differ depending upon the capabilities of the networked devices and/or computer systems connected therewith. For example, communication links 117 may represent one or more coaxial or fiber optic cables, or communication links 117 may represent one or more nonphysical mediums that transmit signals in the electromagnetic spectrum, such as infrared or radio frequency signals. In one embodiment of the present invention, audio bridging device 100 and audio host 120. are connected with each other via home-based network 130 which, in one embodiment of the present invention, represents a phoneline network.

Audio host 120 represents a device equipped to transmit data, including digital audio data, over one or more data networks (e.g. Internet 115 and/or home-based network 130) to one or more destination devices. In one embodiment of the present invention, audio host 120 is a general purpose computer equipped to operate as an audio server or digital jukebox whereby audio data is streamed across a network in digital form to a receiving device so as to achieve near real-time output as analog audio. In another embodiment, rather than streaming the digital audio data, audio host 120 may simply transmit digital audio files residing locally on audio host 120 to a receiving device for subsequent output as analog audio.

Audio bridging device 100 of the present invention represents a special purpose, audio rendering, network enabled device, other than a general purpose computer system, and without the overhead of a large operating system, that is equipped to receive digital audio data transmitted over a network. Audio bridging device 100 is further equipped to convert the received digital audio data into analog audio suitable for use with one or more devices capable of receiving audio input. Examples of such devices include various audio and video devices, such as a home or portable stereo system, an active (e.g. amplified) or passive (e.g. non-amplified) speaker system, a video cassette recorder, a television, and so forth. In one embodiment of the present invention, audio bridging device 100 receives digital audio data transmitted from audio host 120 over home network 130, and converts the received digital audio data to analog audio suitable for use as input into stereo 105 or active speakers 110.

Stereo system 105 represents a standard home stereo system and includes audio amplification unit 102, speaker cable 104, and passive speakers 106. Amplification unit 102 represents an audio component equipped to amplify analog audio signals provided by internal and external audio sources, and forward the amplified audio signals to one or more passive speakers 106 via speaker cable 104. In one embodiment, amplification unit 102 amplifies analog audio signals received from audio bridging device 100. Amplification unit 102 may similarly amplify audio signals provided by an internal or external AM/FM radio tuner or other components, for example.

Stereo system 105 is shown connected with audio bridging device 100 through connector cable 103, however, other wire-based or wireless connection mechanisms may be utilized. In one embodiment, connector cable 103 is a relatively short audio connector cable having a length in the neighborhood of 3 to 6 feet, for example. Furthermore, although stereo system 105 is depicted as including a single audio component (e.g. amplification device 102), additional audio and even video components may be included without departing from the spirit and scope of the invention. Similarly, audio bridging device 100 may be connected to active speakers 110 through connector cable 107 rather than, or in addition to stereo system 105. Various components or functions of stereo system 105 and or active speakers 110 may be combined with that of audio bridging device 100 to form a multi-functional device contained within a single housing.

Figure 2:
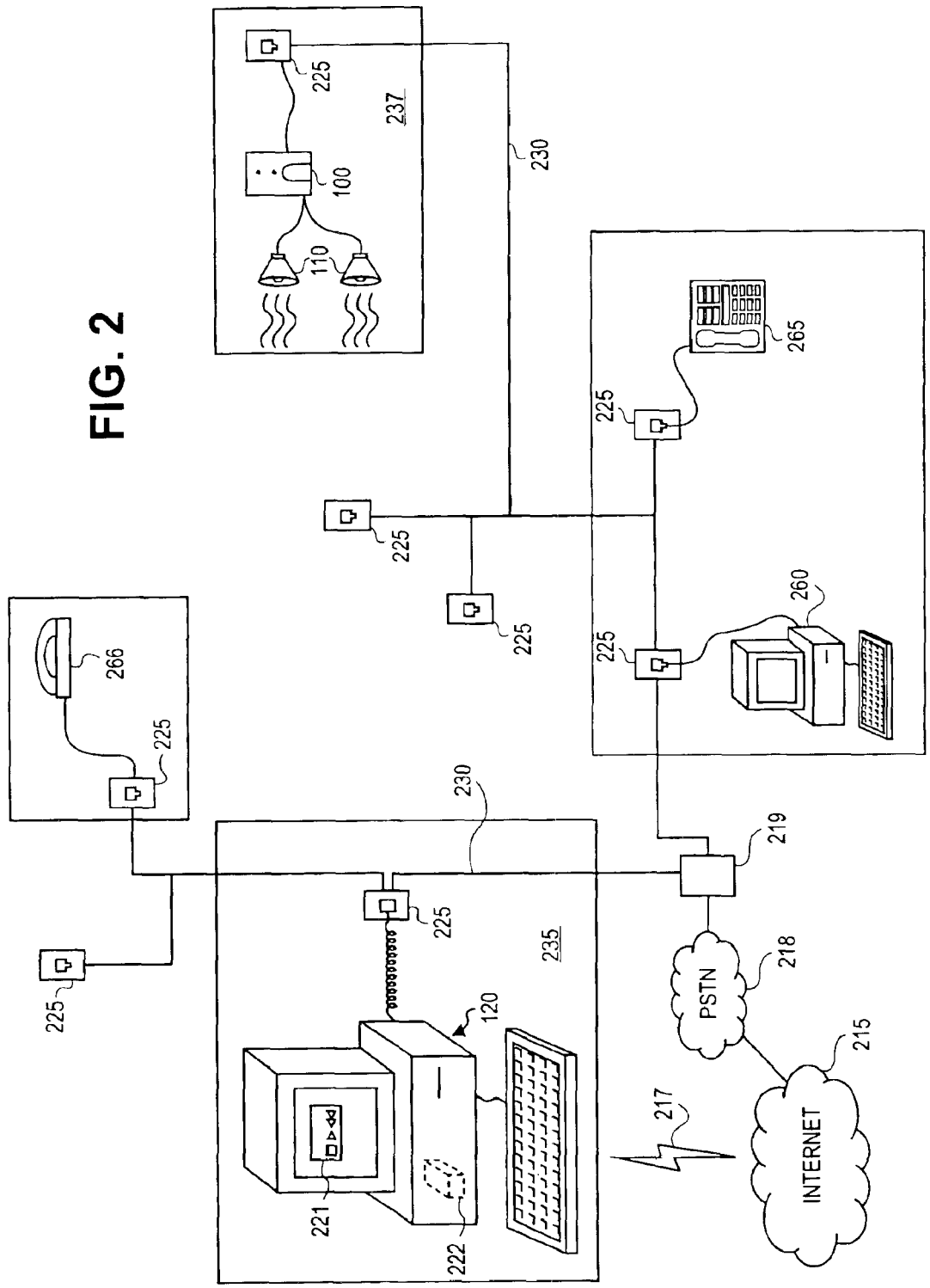
FIG. 2 is a block diagram illustrating one embodiment of a home-based network in which the present invention may be practiced.

FIG. 2 is a block diagram illustrating one embodiment of a home-based network in which the present invention may be practiced. In one embodiment of the present invention, network 230 is a phoneline network (according to Home-PNA Specification 2.0, published December 1999, available from the Home Phoneline Networking Alliance "HomePNA" Internet web site at http:\\www.homepna.org). In other embodiments, however, phoneline network 230 may be replaced by any of the various home-based and non home-based wireline, wireless, baseband, and broadband data communications mediums known in the art. Examples of such data communications mediums include for example, powerline networks, HomeRF networks, Ethernet networks, asynchronous transfer mode (ATM) networks, integrated services digital networks (ISDN & B-ISDN), Infrared networks, BLUETOOTH™ networks, IEEE 802.11 compliant networks (IEEE 802.11 standard-available from the IEEE Standards Department, Copyright Information, 445 Hoes Lane, P.O. Box 1331, Piscataway, NJ 08855-1331), and so forth.

Although various physical network communication mediums may be implemented with respect to the present invention, for purposes of clarity, only a home-based phoneline network implementation will be discussed. In accordance with the present invention, phoneline network 230 represents a data transport medium that utilizes standard home telephone wiring to route data between various network ports 225. In one embodiment, network ports 225 represent standard RJ-11 modular telephone jacks. Phoneline networks provide the distinct advantage of enabling data communication between multiple devices over an arbitrary topology of unterminated wires, not originally intended to transmit data. In one embodiment, phoneline network 230 employs the IEEE 802.3 standard (IEEE 802.3 stardard—published in 1996 and available from the IEEE Standards Department, Copyright Information, 445 Hoes Lane, P.O. Box 1331, Piscataway, NJ 08855-1331) which specifies the carrier sense multiple access/collision detect (CSMA/NCD) protocol for multiple access to a common communication medium.

Phoneline network 230 is connected with publicly switched telephone network (PSTN) 218 through line terminal 219, and may optionally be connected with Internet 215 as well. Line terminal 219 provides a connection point through which the various legs of phoneline network 230 can be connected to a central office of PSTN 218.

Various devices are shown connected to phoneline network 230 via network ports 225, including computing device 260, telephones 265 and 266, audio host 120, and audio bridging device 100 of the present invention. Computing device 260 represents a general purpose computer system and telephones 265 and 266 represent standard telephone devices, all of which are capable of communicating over phoneline network 230. It should be appreciated, however, that computing device 260, and telephones 265 and 266 are optional and may be omitted.

Audio host 120 of FIG. 2 is substantially similar to audio host 120 of FIG. 1. In FIG. 2, audio host 120 is connected with phoneline network 230 and may optionally be connected with Internet 215 through a direct connection such as for example, a cable "MODEM", a satellite link, a digital subscriber line (DSL), and the like. In accordance with the teachings of the present invention, audio host 120 operates to transmit digital audio data from a first location (e.g. home office 235) to second location (e.g. family room 237) utilizing existing phoneline network 230. In one embodiment, audio host 120 is equipped to transmit digital audio data encoded according to a plurality of audio encoding schemes including, for example, moving picture experts group-audio level 3 (MP3) encoding, windows audio-file (WAV) encoding, UNIX audio (AU) encoding, audio interchange file format (AIFF/IEF) encoding, etc. In one embodiment, audio host 120 is equipped to execute application 221 which represents any one of a variety of readily available audio "jukebox" applications, such as for example, RealJukebox™ available from RealNetworks, Inc., of Seattle, Wash.

In one embodiment, audio host 120 transmits digital audio data stored within an internal storage device 222, whereas in other embodiments audio host 120 may transmit digital audio data received from an external data storage device or external network such as Internet 215. Audio host 120 may encapsulate digital audio data for network transmission according to one of a plurality of network transmission protocols including, but not limited to the Transmission Control Protocol/Internet Protocol (TCP/IP) and the User Datagram Protocol/Internet Protocol (UDP/IP), both known in the art. In one embodiment, audio host 120 utilizes UDP/IP in conjunction with a streaming protocol such as the real-time transport protocol ("RTP" as defined in Request for Comments 1889, published January 1996, and available at http://www.rfc-editor.org) to enable dynamic audio streaming across phoneline network 230. In one embodiment of the present invention, audio host 120 operates to transmit and/or stream digital audio data to a single receiving device, such as for example audio bridging device 100, whereas in other embodiments, audio host 120 may utilize IP multicast to transmit and/or stream digital audio data to multiple recipients.

By transmitting such digital audio data over a network to a destination device such as audio bridging device 100, it is possible to render digital audio, including music and sound effects, in a remote location with minimal human intervention and without the need for additional network wiring other than, for example, preexisting telephone cables. Likewise, because such audio data is transmitted in digital form to the remote location prior to being converted to analog audio, audio signal loss due to attenuation is also minimized.

Figure 3:
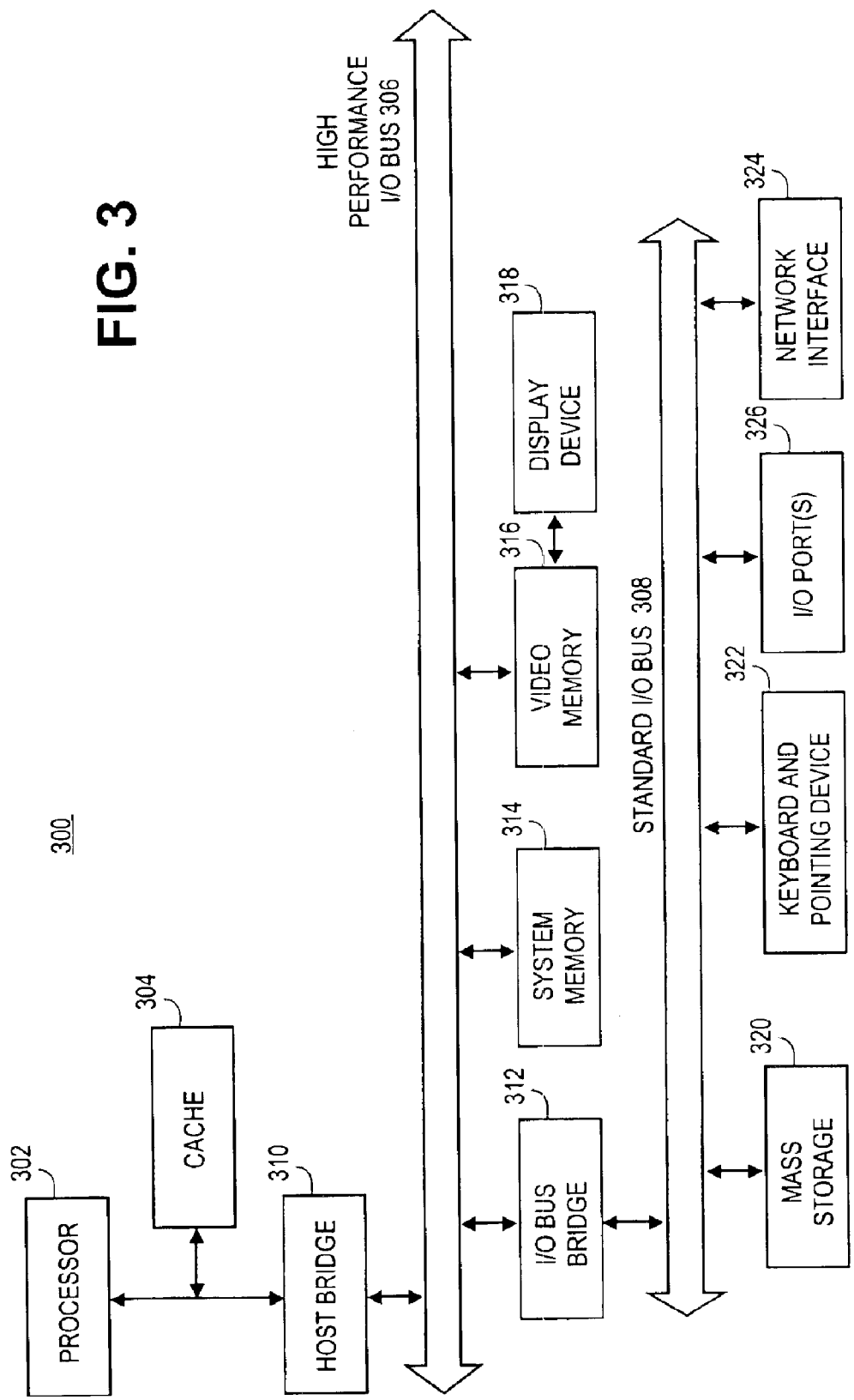
FIG. 3 illustrates one embodiment of a hardware system suitable for use as an audio host.

FIG. 3 illustrates one embodiment of a hardware system suitable for use as audio host 120 described herein. In the illustrated embodiment, hardware system 300 includes processor 302 and cache memory 304 coupled to each other as shown. Additionally, hardware system 300 includes high performance input/output (I/O) bus 306 and standard I/O bus 308. Host bridge 310 couples processor 302 to high performance I/O bus 306, whereas I/O bus bridge 312 couples the two buses 306 and 308 to each other. Coupled to bus 306 are system memory 314, and video memory 316. In turn, display device 318 is coupled to video memory 316. Coupled to bus 308 is mass storage device 320, keyboard and pointing device 322, IO ports 326, and network interface 324. Collectively, these elements are intended to represent a broad category of hardware systems, including but not limited to general purpose computer systems based on the PENTIUM® processor, PENTIUM® II processor, or PENTIUM® III processor manufactured by Intel Corporation of Santa Clara, Calif.

Network interface 324 is used to provide communication between system 300 and any of a wide range of conventional networks, including phoneline network 230. It is to be appreciated that the circuitry of interface 324 may vary depending upon the type of network the system 300 is being coupled to. In one embodiment, network interface 324 is a 21145 phoneline/Ethernet LAN controller available from Intel Corporation of Santa Clara, Calif.

Mass storage 320 is used to provide permanent or extended storage for data and programming instructions to perform the functions described herein, whereas system memory 314 is used to provide temporary storage for the data and programming instructions when executed by processor 302. I/O ports 326 represent one or more serial and/or parallel communication ports used to provide communication between additional peripheral devices which may be coupled to hardware system 300.

It is to be appreciated that various components of hardware system 300 may be re-arranged. For example, cache 304 may be on-chip with processor 302. Alternatively, cache 304 and processor 302 may be packed together as a "processor module", with processor 302 being referred to as the "processor core". Furthermore, certain implementations of the present invention may not require nor include all of the above components. For example, mass storage 320, keyboard and pointing device 322, and/or display device 318 and video memory 316 may not be included in system 300. Additionally, the peripheral devices shown coupled to standard I/O bus 308 may be coupled to high performance I/O bus 306. In addition, in some implementations only a single bus may exist with the components of hardware system 300 being coupled to the single bus. Furthermore, additional components may be included in system 300, such as additional processors, storage devices, or memories.

In one embodiment, the elements of the present invention are implemented as a series of software routines run by hardware system 300 of FIG. 3. These software routines comprise a plurality or series of instructions to be executed by a processor in a hardware system, such as processor 302 of FIG. 3. Initially, the series of instructions are stored on a storage device, such as mass storage 320. It is to be appreciated that the series of instructions can be stored on any conventional storage medium, such as a diskette, CD-ROM, magnetic tape, DVD, ROM, etc. It is also to be appreciated that the series of instructions need not be stored locally, and could be received from a remote storage device, such as a server on a network, via network interface 324.

The instructions are copied from the storage device, such as mass storage 320, into memory 314 and then accessed and executed by processor 302. In one implementation, these software routines are written in the C++ programming language. It is to be appreciated, however, that these routines may be implemented in any of a wide variety of programming languages. In alternative embodiments, the present invention may be implemented in discrete hardware or firmware. For example, an application specific integrated circuit (ASIC) could be programmed with the above described functions of the present invention.

Figure 4:
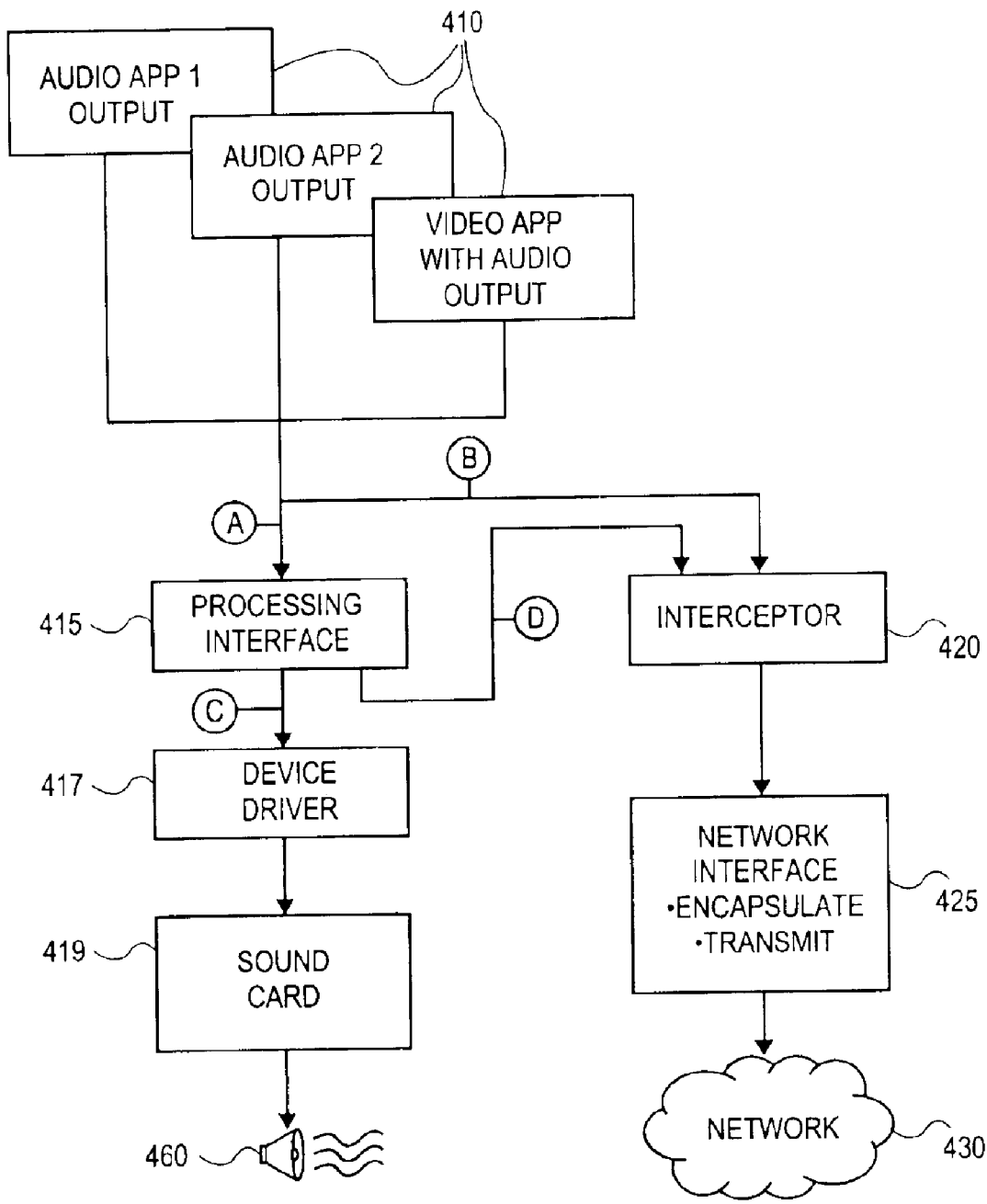
FIG. 4 is a flow diagram illustrating the operation of an audio host according to one embodiment of the present invention.

FIG. 4 is a flow diagram illustrating the operation of audio host 120 according to one embodiment of the present invention. Applications 410 represent multiple software applications that may be executed by audio host 120. Applications 410 include any of a variety of audio and video applications known in the art to cause digital audio data to be played within a computer system. Such digital audio data may be processed by an on-board audio processor in conjunction with one or more dynamically linked libraries and/or device drivers. In one embodiment, applications 410 include an audio jukebox application capable of causing multiple digital data files of various formats including for example, MP3 audio data, to be played on audio host 120 through a sound card.

In FIG. 4, digital audio output from applications 410 may be passed to processing interface 415, and/or interceptor 420 by way of an application program interface (API) or a media control interface (MCI). In one embodiment, by selecting an option within a graphical user interface, a user may choose whether the digital audio output from applications 410 is to be played on local speaker 460, transmitted across network 430, or played locally and transmitted across network 430. If a user selects for the digital audio output to be played on local speaker 460, data path A may be followed. If, however, a user chooses to transmit the digital audio data output across network 430, data path B may be followed to the exclusion of data path A. Data paths A and B need not, however, be mutually exclusive and may both be followed depending upon specific implementations.

Processing interface 415 represents a system level interface, such as a dynamically linked library (DLL), used by applications 410 to process and/or decode the digital audio output by way of one or more function calls or CODECs, for example. In one embodiment, after being handled by processing interface 415, decoded digital audio follows data path C as it is passed from processing interface 415 to device driver 417. Device driver 417 communicates directly with sound card 419 and indirectly with local speaker 460. It should be appreciated that the functionality of processing interface 415 and device driver 417 may be combined into a single interface. In an alternative embodiment, after being handled by processing interface 415, digital audio output may follow data path D passing from processing interface 415 to interceptor 420. It may be desirable for the digital audio output to follow data path D rather than data path B, such that the digital audio data gets decoded through processing interface 415 prior to being transmitted across network 430. This may be desirable in the case where the receiving device is not equipped to decode the audio data. It should be noted that digital audio output may also be passed to processing interface 415 or device driver 417 after passing through interceptor 420.

Interceptor 420 represents an interface that operates to effectively intercept the digital audio output from applications 410 and pass the data to network interface 425 where it may be encapsulated and transmitted across network 430. Interceptor 420 may operate to temporarily or permanently re-route static or dynamic links that may point to processing interface 415, such that they point to interceptor 420. Similarly, interceptor 420 may establish a static or dynamic link back to processing interface 415.

Interceptor 420 further operates to identify whether the digital audio output is encoded according to one of a plurality of audio coding schemes. If the digital audio output is encoded, interceptor 420 operates to classify the particular encoding type and pass both the digital audio output along with the coding information to network interface 425. Network interface 425 operates to encapsulate and transmit the digital audio data across network 430. Depending upon the size of the data, network interface 425 may segment the data into multiple packets or datagrams prior to transmission. In one embodiment, the data is encapsulated according to the IEEE 802.3 and Internet protocols containing a variety of data sections and fields. In one embodiment, network interface 425 formulates data packets for transmission to a receiving device based upon previous communication with the receiving device.

Figure 5:
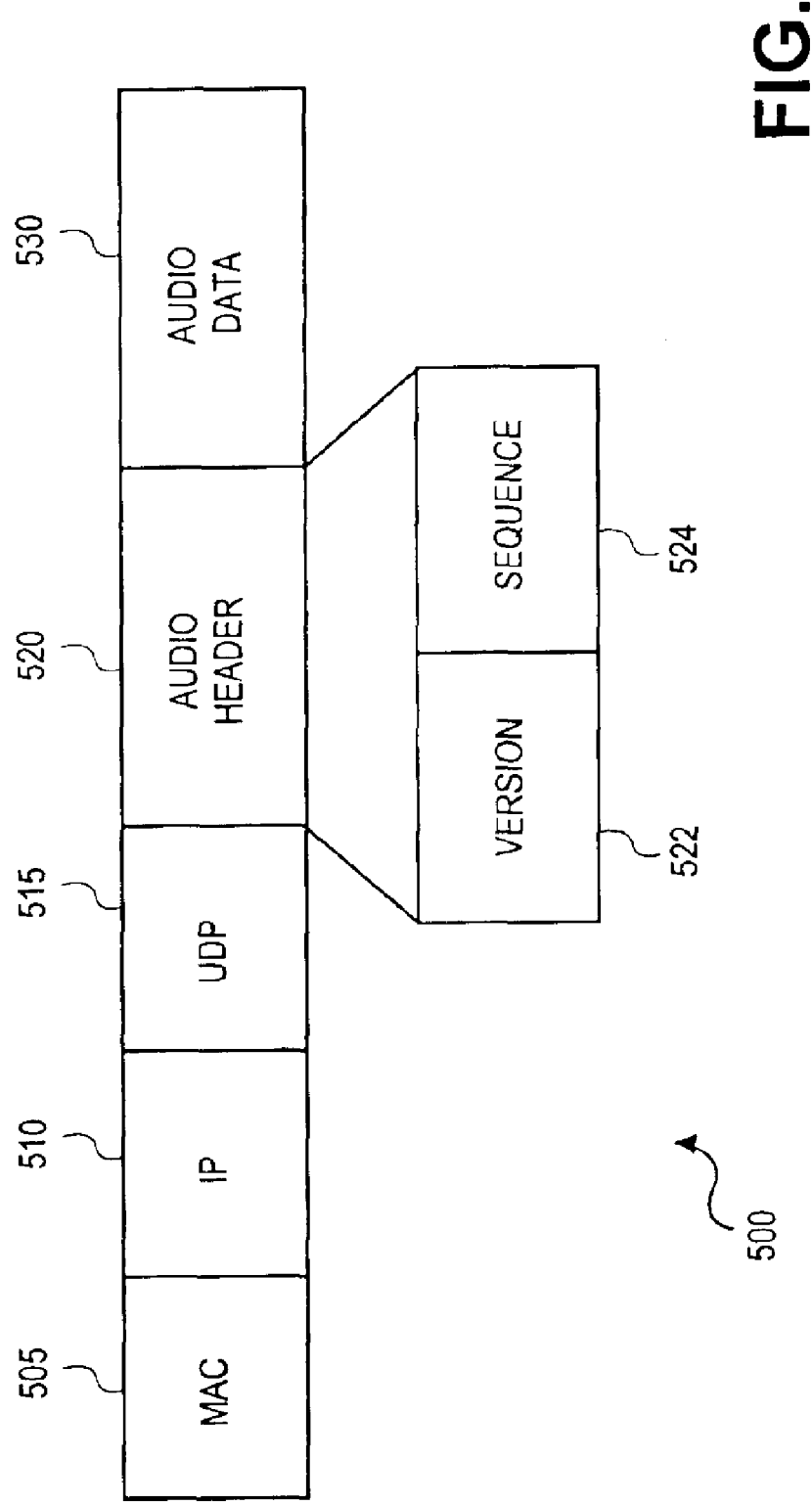
FIG. 5 illustrates a digital audio data packet formatted according to one embodiment of the present invention.

FIG. 5 illustrates a digital audio data packet formatted according to one embodiment of the present invention. Referring to FIG. 5, digital audio packet 500 is divided into various network transmission sections including: Media Access Control (MAC) header section 505, Internet Protocol (IP) header section 510, UDP header section 515, and various audio sections including: digital audio data header section 520, and digital audio data payload section 530. MAC header 505 contains the various data fields necessary to operate according to the IEEE 802.3 specification including, a network destination address, a network source address, and a data length field. IP header 510 contains the various data fields specified under RFC 1042, published February 1988, which addresses using IP over IEEE 802 networks. UDP header 515 contains various fields including a source port field, a destination port field, a data length field, and a checksum field.

In addition to the MAC, IP, and UDP header sections, the digital audio packet 500 also contains digital audio data header section 520, and digital audio data payload section 530. In one embodiment, digital audio data header section 520 contains version field 522 and sequence field 524, whereas digital audio data payload section 530 contains encoded audio data. In one embodiment, the version field is used by a digital audio data transmitting source, such as audio host 120, to indicate to a receiving device, such as audio bridging device 100, which one of multiple audio encoding schemes was used to encode the associated digital audio data payload. In one embodiment, each supported audio encoding scheme is represented by an indicator code that may be referenced via a lookup table, for example. In one embodiment, sequence field 524 is used by audio host 120 to indicate an order according to which the digital audio data was segmented, and therefore an order according to which the data should be reconstructed once received by audio bridging device 100.

Although various data field and header sections have been described with respect to the digital audio data packet of the present invention, it should be apparent that a variety of other implementations are equally acceptable. For example, instead of digital audio packet 500 including a separate header section 520, and data payload section 530, the sections may be combined into a single section. Similarly, if TCP/IP is used as a transfer protocol, UDP header 515 may be replaced by an appropriate TCP header (not shown), and/or sequence field 524 may be omitted.

Figure 6:
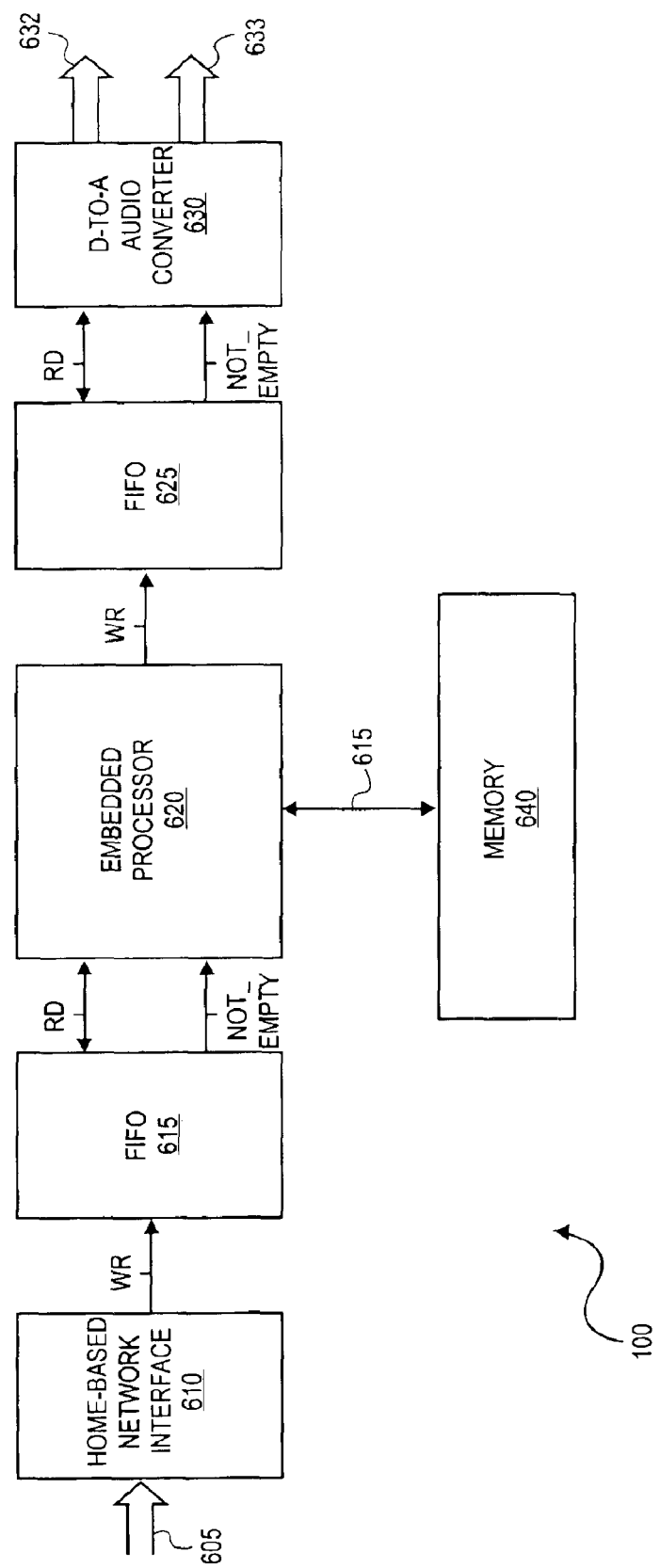
FIG. 6 is a block diagram illustrating a dedicated digital-to-analog audio bridging device ("audio bridging device") according to one embodiment of the present invention.

FIG. 6 is a block diagram illustrating an audio bridging device according to one embodiment of the present invention. Audio bridging device 100 includes home-based network interface 610, FIFO buffers 615 and 625, embedded processor 620, audio converter 630, and memory device 640 coupled together as shown. Additionally, audio bridging device 100 is coupled with data input port 605, and with audio output ports 632 and 633 as shown.

Home-based network in interface 610 represents a communications interface through which network data is transmitted and received. Home-based network interface 610 represents a device further equipped to provide data communications across harsh networking environments such as home-based phoneline networks, powerline networks and/or HomeRF networks. In much home-based networks, as well as other less controlled harsh networking environments, it is sometimes difficult to distinguish noise or echo phenomenon caused by various environmental factors from another transmission source. For this reason, alternative networking approaches have been developed to address these harsh networking concerns. One such approach can be found in U.S. patent application ser. No. 09/378,555, entitled "A Networking Method And Apparatus Using Silent Slots To Facilitate Transmission Collision Detection", filed Aug. 19,1999 and assigned to the corporate assignee of the present application. In one embodiment, the teachings of U.S. patent application ser. No. 09/378,555 are implemented within home-based network interface 610. In one embodiment, home-based network interface 610 is an IEEE 802.3 compliant interface supporting the CSMA/CD protocol. In one embodiment, home-based network interface 610 is an Intel 21145 phoneline/Ethernet LAN controller that supports communication over both Ethernet and phoneline networks.

FIFO buffers 615 and 625 are used to coordinate data exchange between the various devices shown in FIG. 6. For example, after receiving network data, home-based network interface 610 writes the data to FIFO buffer 615 which subsequently asserts a $not_{13}$ empty signal indicating the presence of the data to embedded processor 620. Once the $not_{13}$ empty signal is detected, embedded processor 620 reads the data from FIFO buffer 615 for processing. FIFO buffer 625 is connected between embedded processor 620 and is operationally similar to FIFO buffer 615. It will be apparent to one skilled in the art, however, that one or both of FIFO buffers 615 and 625 may be included within any of the various devices shown in FIG. 6, or may be omitted completely.

Embedded processor 620 represents one of various processing devices known in the art to process data, including for example a general or special purpose microprocessor or microcontroller that operates according to one of multiple computing paradigms including, reduced instruction set computing (RISC), and complex instruction set computing (CISC). In one embodiment, embedded processor 620 is an ARM7 series embedded processor available from ARM Inc., of Los Gatos Calif. In one embodiment, embedded processor 620 is configured to perform a variety of operations on digital audio data received from home-based network interface 610. As those skilled in the art will appreciate, by virtue of the dedicated nature of the audio bridging device, the embedded processor may be a relatively low cost, low processing power "microcontroller", and yet because it is not asked to undertake a variety of non-audio related tasks, it is nevertheless capable of bridging very high quality audio notwithstanding its limited processing capability.

Audio converter 630 represents a digital to analog (D-to-A) data converter to receive digital audio data processed by embedded processor 620, and convert the digital audio data to analog audio for output through audio output ports 632 and 633. In one embodiment, audio converter 630 is a TMS320VC5416 16-bit digital signal processor available from Texas Instruments Inc., of Dallas, Tex. As those skilled in the art will recognize, the functionality of audio converter 630 and embedded processor 620 may be combined within a single device.

Memory device 640 represents a non-volatile data storage device to hold instructions to be executed by embedded processor 620. Memory device 640 may include any of the various read only memory (ROM) devices known in the art such as a programmable read-only memory (PROM), an electronically erasable programmable read-only memory (EEPROM), flash memory, and so forth. In one embodiment of the present invention, audio bridging device 100 is equipped to receive additional instructions, data, and/or CODECs to replace or supplement information previously stored in memory device 640. In one embodiment, audio bridging device 100 receives such data through home-based network interface 610, whereas in another embodiment, audio bridging device 100 can receive such data by way of an additional input port (not shown) coupled to memory device 640. In such a manner, audio bridging device 100 may be updated with new or improved audio CODECs or other data as necessary. Audio bridging device 100 can also include a volatile data storage device (not shown) such as random access memory (RAM), dynamic random access memory (DRAM), synchronous dynamic random access memory (SDRAM), and the like.

Figure 7:
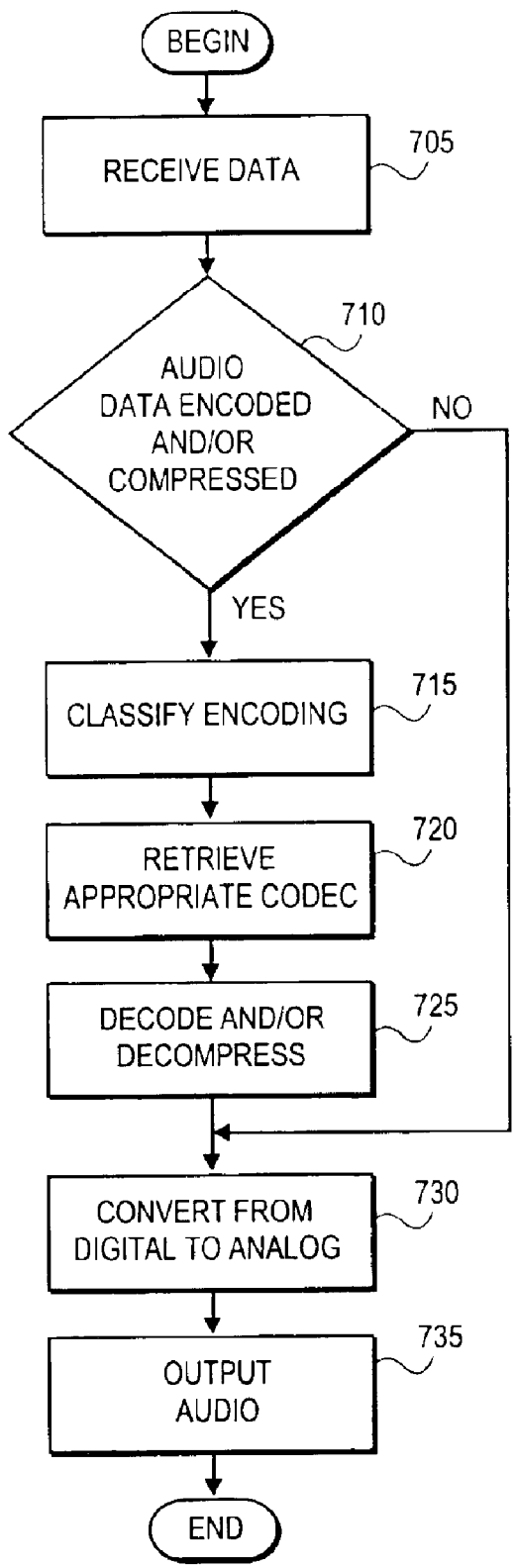
FIG. 7 is a flow diagram illustrating the operation of the audio bridging device according to one embodiment of the present invention.

FIG. 7 is a flow diagram illustrating the operation of audio bridging device 100 according to one embodiment of the present invention. Referring to FIG. 7, with reference to FIG. 6, home-based network interface 610 receives digital audio data transmitted across phoneline network 203 through data input port 605 (705). Upon receiving the digital audio data, home-based network interface 610 operates in a conventional manner to separate the various network transmission data (e.g. MAC, IP, and TCP or UDP headers) from the digital audio data (e.g. digital audio data header and digital audio data payload sections). Once the network data and digital audio data are separated, the digital audio data is passed to memory 640 which causes embedded processor 620 to be interrupted via data bus 615. Once the digital audio data has been passed to memory 640, embedded processor 620 operates to identify whether the digital audio data has been encoded according to one of multiple audio or video coding schemes (710). If embedded processor 620 identifies that the received digital audio data has been encoded, embedded processor 620 subsequently classifies which particular coding scheme was used (715). In one embodiment, embedded processor 620 utilizes the earlier describe indicator code 522 provided within the digital audio data packet to identify and classify the presence and type of data encoding. According to one embodiment of the present invention, once embedded processor 620 identifies that a particular encoding scheme was used, embedded processor 620 accesses memory device 640 or similar equipped memory device to retrieve an appropriate CODEC (720) with which the digital audio data is decoded (725). In the case that the digital audio data is compressed, embedded processor 620 further operates to decompress the digital audio data. Once the digital data has been decoded and/or decompressed, or if the data was not encoded or compressed to begin with (710), the digital audio data is passed to audio converter 630 where the digital audio data is then converted to analog audio (730). Once the digital audio data has been converted to analog audio, the analog audio is passed through audio output ports 632 and 633 (735).

Thus a dedicated digital-to-analog audio bridging system has been described. Whereas many alterations and modifications of the present invention will no doubt become apparent to a person of ordinary skill in the art after having read the foregoing description, it is to be understood that any particular embodiment shown and described by way of illustration is no way intended to be considered limiting. Therefore, references to details of various embodiments are not intended to limit the scope of the claims which in themselves recite only those features regarded as essential to the invention.

What is claimed is:

1. A method comprising:
    receiving at an audio-rendering device, data comprising digital audio data transmitted across a network from a host;
    determining whether the received digital audio data is encoded;
    selecting a decoding scheme based on one of at least two coding schemes by which the received digital audio data is encoded, if the determining determines that the received digital audio data is encoded;
    decoding the encoded digital audio data in accordance with the selected decoding scheme to generate decoded audio data, if the determining determines that the received digital audio data is encoded;
    preparing the decoded audio data for output, if the determining determines that the received digital audio data is encoded; and
    preparing the received digital audio data for output without decoding, if the determining determines that the received digital audio data is not encoded.

2. The method according to claim 1, wherein:
    preparing the received digital audio data for output comprises converting the received digital audio data to analog audio for output; and
    preparing the decoded audio data for output comprises converting the decoded audio data to analog audio for output.

3. The method according to claim 1, wherein determining whether the received digital audio data is encoded according to one of the at least two coding schemes comprises determining whether the received digital audio data is encoded according to coding schemes including mp3, wav, au, and aiff.

4. The method according to claim 1, wherein receiving digital audio data comprises receiving a plurality of digital audio data segments and reconstructing the digital audio data from the received plurality of digital audio data segments.

5. The method according to claim 4, wherein determining whether the received digital audio data is encoded according to one of at least two coding schemes comprises identifying an indicator code included within at least one of the plurality of digital audio data segments.

6. The method according to claim 2, further comprising:
    determining whether the received digital audio data is compressed; and
    if the received digital audio data is determined to be compressed, then decompressing the compressed digital audio data based upon the selected decoding scheme.

7. The method according to claim 6, further comprising providing as output the analog audio to an amplification device.

8. The method of claim 1, wherein the digital audio data is received across at least one of a plurality of networks including a phoneline network, a powerline network, and a HomeRF network.

9. A method of claim 5, further comprising:
    selecting the one of the two coding schemes based on the identified indicator code.

10. The method of claim 9, wherein selecting the one of the two coding schemes based on the identified indicator code comprises:
    accessing a lookup table that includes entries for the at least two coding schemes;
    comparing the identified indicator code to the entries in the lookup table; and
    identifying an entry in the lookup table that corresponds to the indicator code, wherein the entry is the coding scheme by which the received digital audio data is encoded.

11. The method of claim 2, wherein converting the received digital audio data to analog audio for output comprises converting the received digital audio data to analog audio for output to a speaker proximate the audio-rendering device.

12. A special purpose audio-rendering device comprising:
    a network interface to receive digital audio data transmitted over a network from an audio host; and
    a processor coupled with the network interface to:
        determine whether the received digital audio data is compressed;
        select a decoding scheme based on one of at least two coding schemes by which the received digital audio data is encoded, if the received digital audio data is determined to be compressed;
        decode the encoded digital audio data in accordance with the selected decoding scheme to generate decompressed audio data, if the received digital audio data is determined to be compressed; and a converter coupled to the processor to:
  convert the decompressed audio data to analog audio for output, if the processor determines that the received digital audio data is compressed; and
  convert the received digital audio data to analog audio for output without decoding, if the processor determines that the received digital audio data is uncompressed.

13. The special purpose audio-rendering device according to claim 12, further comprising a read only memory coupled to the processor to store at least one CODEC.

14. A residential network audio system comprising:
  a host device disposed in a first location to execute an audio application to play digital audio data and to selectively intercept the digital audio data output from the audio application for transmit over a network;
  an audio bridging device disposed in a second location, the audio bridging device communicatively coupled to the host device via the network to receive the digital audio data transmitted from the host device, to determine whether received digital audio data is encoded, to select a decoding scheme based on one of at least two coding schemes by which the received digital audio data is encoded, to decode the received digital audio data to generate decoded audio data in accordance with the selected decoding scheme if the received digital audio data is encoded, to convert the decoded audio data to analog audio for output if the received digital audio data is encoded, and to convert the received digital audio data to analog audio for output if the received digital audio is not encoded; and
  stereo equipment communicatively coupled to the audio bridging device, the stereo equipment to amplify the analog audio.

15. The residential network audio system according to claim 14, wherein the network comprises a network including at least one of a phoneline network, a powerline network, and a HomeRF network.

16. The residential network audio system according to claim 14, wherein the audio bridging device is further disposed to:
  determine whether the received digital audio data is compressed; and
  decompress the compressed digital audio data in accordance with the selected decoding scheme.

17. The residential network audio system according to claim 14, wherein the digital audio data is transmitted according to the real-time transport protocol (RTP).

18. An article comprising a machine readable medium having a plurality of machine readable instructions stored thereon, that when executed by the machine, cause the machine to:
  receive digital audio data;
  determine whether the received digital audio data is encoded;
  select a decoding scheme based on one of at least two coding schemes by which the received digital audio data is encoded, if the received digital audio data is determined to be encoded;
  decode the encoded digital audio data in accordance with the selected decoding scheme to generate decoded audio data, if the received digital audio data is determined to be encoded; and
  prepare the decoded audio data for output, if the determining determines that the received digital audio data is encoded; and
  prepare the received digital audio data for output without decoding, if the determining determines that the received digital audio data is not encoded.

19. The article of claim 18, wherein receiving the digital audio data further comprises receiving the digital audio data transmitted across a local area network from a host device.

20. The method of claim 18, wherein preparing the received digital audio data for output comprises converting the received digital audio data to analog audio for output.

* * * * *